(12) United States Patent
Gaul

(10) Patent No.: US 6,414,792 B1
(45) Date of Patent: Jul. 2, 2002

(54) ANALYZER INSERT FOR A POLARIZING MICROSCOPE

(75) Inventor: Norbert Gaul, Solms-Oberbiel (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/719,535
(22) PCT Filed: May 28, 1999
(86) PCT No.: PCT/DE99/01574
   § 371 (c)(1),
   (2), (4) Date: Dec. 13, 2000
(87) PCT Pub. No.: WO99/66363
   PCT Pub. Date: Dec. 23, 1999

(30) Foreign Application Priority Data

Jun. 18, 1998 (DE) .......................... 198 27 175

(51) Int. Cl.⁷ .......................... G02B 21/00; G02B 27/28
(52) U.S. Cl. .......................... 359/500; 359/371
(58) Field of Search .................. 359/500, 371, 359/386

(56) References Cited

U.S. PATENT DOCUMENTS 2,651,971 A * 9/1953 Rosch .......................... 359/500

FOREIGN PATENT DOCUMENTS

| DE | 1 278 134 | 9/1968 |
| DE | 69 22 326 U | 11/1969 |
| EP | 0 610 945 A1 | 8/1994 |
| JP | 08124990 | 5/1996 |

* cited by examiner

*Primary Examiner*—Jon Henry
(74) *Attorney, Agent, or Firm*—Simpson & Simpson, PLLC

(57) ABSTRACT

The invention relates to an analyzer insert (1) in which the rotation of an adjustment wheel (2) accessible from the outside is transmitted by means of two parallel adjustment levers (8, 9) of equal length onto a rotatable analyzer (3) which can be inserted into the optical path of the microscope. The one ends (10, 11) of the adjustment levers (8, 9) are rotationally mounted at the level of the adjustment wheel (2) on bearing axles (14) near the rim while the other ends (12, 13) are mounted on the axles at the level of the analyzer holder (4). At the level of the adjustment wheel (2) and the analyzer holder (4), in relation to the axes of rotation (15, 16) of same these axles generate force levers of equal length, which are situated pairwise at a 90° angle to each other. In the 0° position of the analyzer (3) all four bearing axles (14) are situated on a straight line. The analyzer (3) can be moved into any position between 0° and 180° precisely and without slip. An extremely flat analyzer insert (1) is obtained when the adjustment levers (8, 9) consist of thin sheets and engage slits (20, 21) inside the analyzer holder. This new analyzer insert (1) is easier and more economical to produce than known analyzer inserts with drive belts or toothed wheels.

16 Claims, 2 Drawing Sheets

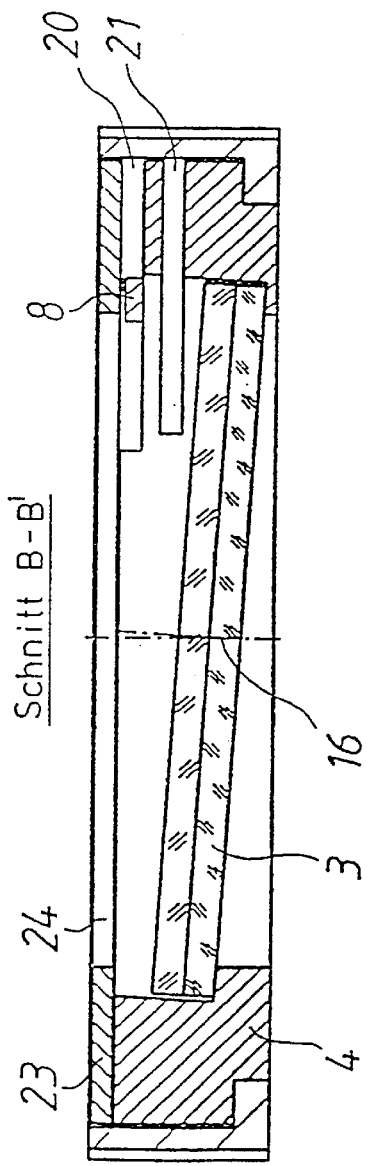
Fig.2 Schnitt B-B'
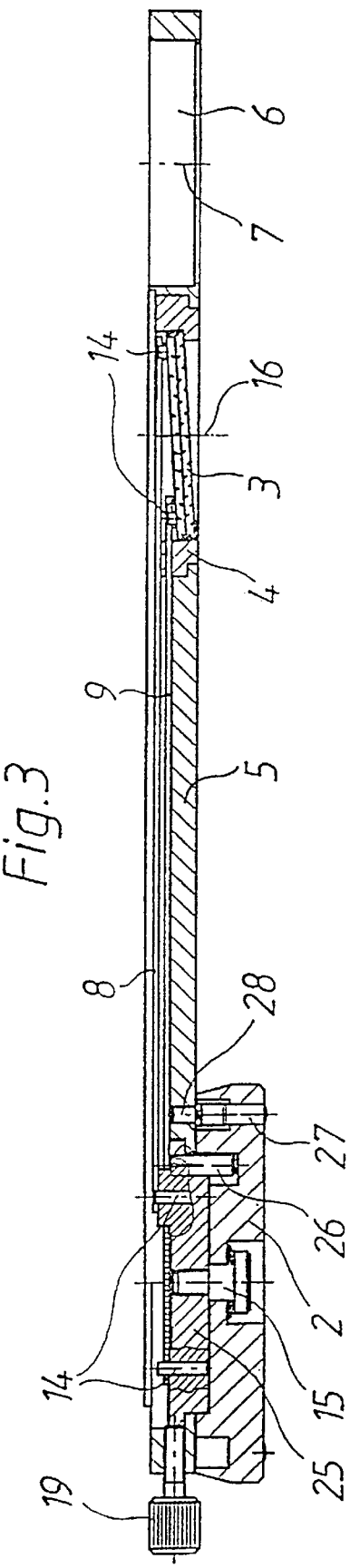
Fig.3

ANALYZER INSERT FOR A POLARIZING MICROSCOPE

CROSS-REFERENCE TO RELATED APPLICATIONS

The present application is the U.S. national phase under 35 U.S.C. 371 of International Application No. PCT/DE99/01574 filed May 28, 1999 claiming priority of German Patent Application No. 198 27 175.1 filed Jun. 18, 1998.

BACKGROUND OF THE INVENTION

1. Field of the Invention

The invention relates to an analyzer plug-in unit for a polarization microscope. The analyzer insert is of the type having a support that can be inserted into the optical path of the microscope, an externally positioned adjusting wheel that can be manipulated by hand, and adjacent thereto, in the direction of insertion, an internally positioned analyzer that is mounted on a rotating analyzer mount so the analyzer can be inserted into the optical path of the microscope, and transmission means for transmitting the rotating motion of the adjusting wheel to the analyzer mount and analyzer.

2. Description of the Related Art

DE-GM 69 22 326 describes an analyzer for a polarization microscope, in which there are mounted on a support that can be inserted into the microscope's optical path an adjusting wheel that is manually operated and is externally positioned, as well as an internally positioned analyzer adjacent thereto in the direction of insertion, on a analyzer mount that is able to rotate. A geared combination consisting of a screw on the adjusting wheel and a gear ring on the analyzer mount serve to transmit the rotating motion of the adjusting wheel to the analyzer. The disadvantage of this design rests in the fact that gears with gearwheels are very expensive and in that the scale needed for installing the analyzer insert is necessarily large.

DE-AS 12 78 134 describes an interference accessory for a polarization microscope with a crystal plate positioned on a support. The latter can be moved perpendicular to the microscope's optical path by means of a push-rod and can be brought into defined locking positions by means of interlocking devices. Positioning between the locking positions and the rotation of the crystal plate is not possible. Furthermore, the push-rod and the locking device require much space.

SUMMARY OF THE INVENTION

The goal of this invention is to create a cost-effective analyzer insert of slight height which gives the analyzer an adjusting range of 180° and which permits precise and slip-free adjustment.

In the analyzer insert according to the invention the rotating motion of the adjusting wheel is transmitted to the rotating analyzer by two equally long adjusting levers that run parallel to each other. To this end, the ends of the adjusting lever on the adjusting wheel and the other ends on the analyzer mount are mounted in rotating fashion, in each case on bearing axles close to the rim. The bearing axles are positioned in such a way that they produce force levers on the adjusting wheel and on analyzer mount that are of equal length with respect to their rotating axes and which lie at a 90° angle to each other.

In the initial position, corresponding to the 0° position, all four bearing axles lie on a straight line. In order to make this possible, one adjusting lever can be positioned at a higher level than the other. As a result, the adjusting levers can partly lie one above the other in the initial position. Another possibility is to design the adjusting levers with angled ends. In this way the four bearing axles will lie on a straight line, even when the two adjusting levers are mounted at the same height. In addition, the adjusting levers may exhibit recesses which prevent them from striking against the bearing axles of the other levers.

Rotating the adjusting wheel will cause the bearing axles to further turn both on the adjusting wheel and on the analyzer mount and the two adjusting levers to be brought to a wider distance apart. In the 90° position the separating distance is greatest, and they are symmetrically positioned at either side of the connecting line that is formed by the rotating axes of the adjusting wheel and the analyzer. Upon further rotation, the distance between the adjusting levers lessens, until the four bearing points again lie on a straight line in the 180° position, in a position opposite the starting position. In this position also it proves to be advantageous if the adjusting levers and their position is like that already described for the 0° position.

The use of two adjusting levers in the described configuration permits a uniform and precise rotating motion between 0° and 180° and a dead point is avoided upon rotation of the adjusting wheel and the translation of force.

The adjusting wheel must turn in the right direction in order for the adjusting levers not to overlap the analyzer area and overshadow the optical path of the microscope. This is accomplished with markings or stops that prevent rotation beyond the 0° or the 180° position.

To this end, the bearing axles on the adjusting wheel and/or the analyzer mount can be advantageously applied to the same area. The adjusting levers positioned on the same surface then enter the "terminal positions" 0° and the 180°, run against the other bearing axle, and cease to rotate. To permit a particularly flat design, the adjusting levers can be manufactured out of thin sheets of metal. These might be subject to bending when the adjusting levers run against each other. To prevent this, the analyzer insert will ideally be provided with overrun protection. To this end, two protruding pins, corresponding to the 0° or 180° position of the analyzer, are mounted on the adjusting wheel. A stop screw is positioned on the support in the swivel range of these pins, and the pins will strike the screw in the 0° or 180° position of the analyzer. Overrun of the given positions is thereby prevented.

The adjusting levers can be economically produced from identical thin metal sheets. Simple metal pins can be used as bearing axles. Boreholes can be applied to the ends of the metal strips; the diameter of these boreholes is only slightly larger than the diameter of the pins. The adjusting levers can thus turn freely around the bearing pins.

Thus, the analyzer insert according to the invention can be realized simply and with economical components and is considerably more cost-effective than known analyzer inserts with gearwheels or transmission belts. In addition, the problem of slippage that arises with this prior art does exist in the present invention, since the force is transmitted directly with the rigid adjusting levers.

A particularly flat design is achieved with the use of the adjusting levers. Particularly when thin metal sheets are used for the adjusting levers, it is possible to restrict the thickness of the insert to 5 mm, inclusive of the translucent protective covering in front of the analyzer. This kind of exemplary embodiment of the invention is described below in greater detail, with reference to the schematic drawings.

BRIEF DESCRIPTION OF THE DRAWINGS

Shown are:

FIG. 2 an advantageous design of the analyzer mount, with guide slots for the adjusting lever.

FIG. 3 shows a longitudinal section through the analyzer insert.

DETAILED DESCRIPTION OF THE PREFERRED EMBODIMENTS

Figure 1A:
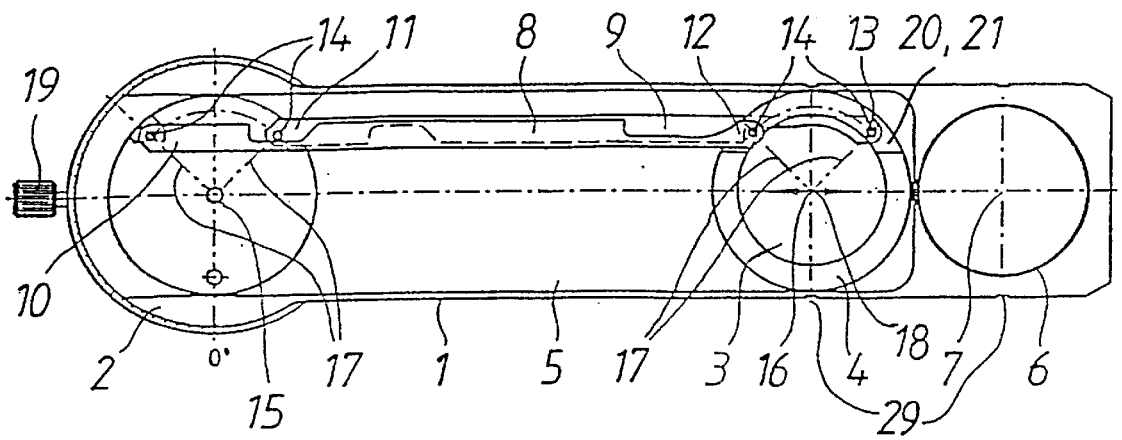
FIG. 1a: an analyzer insert in 0° position, shown in top view.

FIG. 1a shows a top view of the analyzer insert 1 in the 0° position. It consists of a support 5, mounted on which is an adjusting wheel 2 for external manipulation, with a rotating axis 15, and adjacent to said adjusting wheel, in the direction of insertion, an analyzer mount 4. The analyzer mount 4 is swivel-mounted on a rotating axis 16. Installed in the analyzer mount 4, at a slight angle (about 3.5°) relative to the rotating axis 16, is an analyzer 3. The support 5 exhibits a hollow hole 6 on its end that extends beyond the analyzer 3.

The analyzer insert 1 can be arrested in two locking positions by means of two grooves 29. In the first locking position, the empty hole 6 is fitted into the microscope in such a way that the optical path of the microscope, with optical axis 7, can pass through unaffected. By sliding the analyzer insert 1 in the insertion direction and out of the first locking position, the second locking position is reached and the analyzer 3 is brought into the optical path of the microscope. In this position, the rotating axis 16 of the analyzer mount 4 coincides with the optical axis 7 of the microscope. To avoid undesired reflexes in the microscope's optical path, the analyzer 3 in the analyzer mount 4 is installed at a slight incline (not shown) to the rotating axis 16. Its direction of transmission 18 is indicated by an arrow in the drawing.

Mounted between the adjusting wheel 2 and the analyzer mount 4 are two equally long adjusting levers 8 and 9, which transmit the turning motion of the adjusting wheel 2 to the analyzer mount 4 and thus to the analyzer 3. To this end, the ends 10 and 11 of the adjusting levers 8 and 9 are swivel-mounted on the adjusting wheel 2 and the ends 12 and 13 are swivel-mounted on the analyzer mount 4, in each case on bearing axles 14 close to the rim. Both with regard to the rotating axis 15 of the adjusting wheel and with regard to the rotating axis 16 of the analyzer mount, these bearing axles 14 form two equally long force levers 17 at an angle of 90°. The adjusting levers 8, 9 have arc-shaped recesses in the direction of those ends attached to the analyzer, such that the microscope's optical path is not overshadowed by the adjusting levers 8, 9, even when the analyzer insert 1 is in inserted and lies in the initial position.

In the initial position shown here, which corresponds to the 0° position of the analyzer 3, all bearing axles 14 lie on a straight line and the two adjusting levers 8 and 9 lie parallel to each other and partially overlap, in two planes that are close together. A securing screw 19 permits the adjusted orientation of the analyzer 3 to be held in place. To give the analyzer 3 a new orientation, the securing screw 19 is loosened. For the better orientation of the microscope user the adjusting wheel 3 is divided into degrees 22.

Figure 1B:
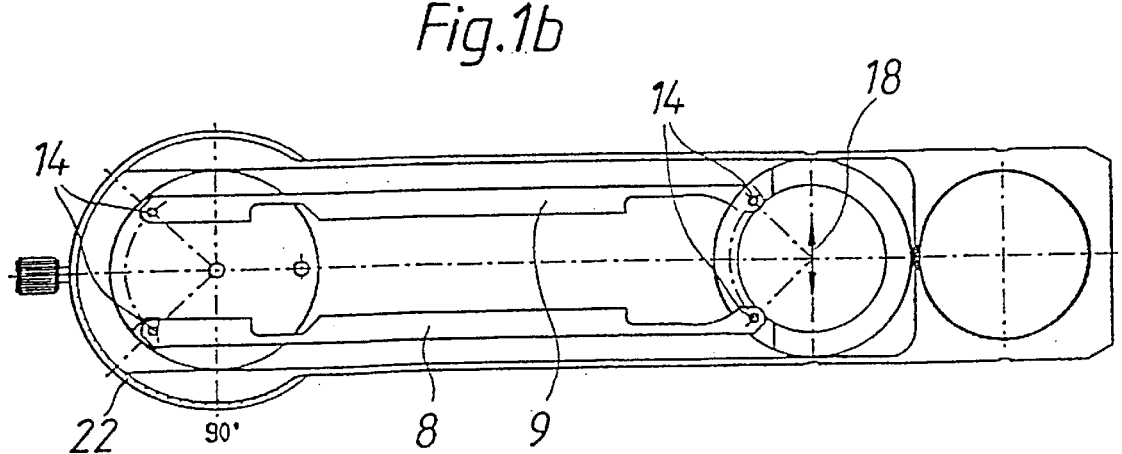
FIG. 1b: an analyzer insert in 90° position, shown in top view.

By turning the adjusting wheel 2 counterclockwise, the analyzer 3 is brought into the 90° position, which is shown in FIG. 1b. The actual transmission direction 18 of the analyzer 3 is shown. Corresponding to the movement of the adjusting wheel 2, the adjusting levers 8 and 9, along with their swivel-mounted ends 10 and 11, or 12 and 13, have also moved and now lie parallel, though at a somewhat greater distance and symmetric to the connecting line between the rotating axes 15 and 16 of the adjusting wheel 2 and the analyzer 3.

Figure 1C:
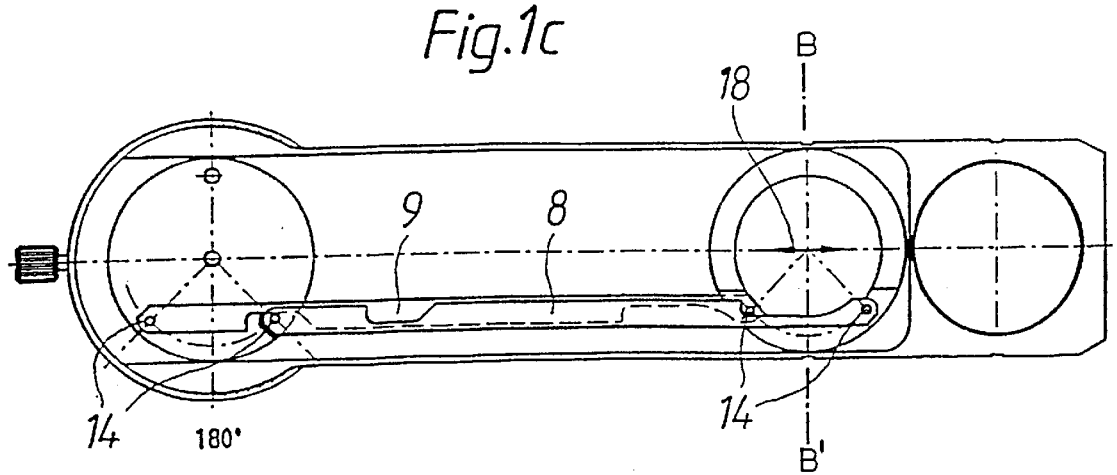
FIG. 1c: an analyzer insert in 180° position, shown in top view.

With continued counterclockwise rotation of the adjusting wheel 2 the analyzer 3 is brought into the 180° position, which is shown in FIG. 1c. The new transmission direction 18 of the analyzer 3 is again indicated. In this position the two adjusting levers 8 and 9 are in the lower position and their bearing axles 14 again lie on a straight line.

The analyzer insert shown in FIGS. 1a–c is a particularly advantageous embodiment and can be realized with a maximum thickness of 5 mm. To this end, the adjusting levers 8 and 9 are produced of thin sheet metal and the analyzer mount 4 is designed specially to achieve the desired flattened shape. The mount 4 exhibits two circular and parallel slots 20, 21 with which the ends 12 and 13 of the adjusting levers 8 and 9 engage and are guided. In the process, the slot 20, a milled down area on the surface of the analyzer mount, serves as a seat for the upper adjusting lever 8. The slot 21 serves as seat for the lower adjusting lever 9 and is worked into the analyzer mount 4 beneath the slot 20.

With the parallel slots 20, 21 the adjusting levers 8, 9 run on different planes. In FIGS. 1a–c, therefore, the adjusting lever 8 appears as the upper one and adjusting lever 9 as the lower one, which in FIGS. 1a–c is partially covered by the adjusting lever 8 and the analyzer mount 4. The appertaining bearing axles 14 run through the slots 20, 21. The slots 20, 21 can also be produced identically.

As can be seen from FIGS. 1a–c, the slots 20, 21 join in the rotation, according to the different analyzer positions. Both in the 0° position and in the 180° position the slots 20, 21 also limit the turning range of the analyzer mount 4, and thus of the adjusting wheel 2 also, to a maximum of 180°. It is consequently impossible to swing the adjusting levers 8, 9 over the analyzer area and overshadow the optical path of the microscope. So that the thin metal sheets of the adjusting levers 8, 9 do not bump against the given end of the corresponding slot, an feature providing overrun protection can be advantageously applied here, as will be described below with reference to FIG. 3.

FIG. 2 shows a highly enlarged detail of the analyzer mount 4 according to the invention, with slots 20, 21. It corresponds to a section along line BB' from FIG. 1c. Shown are the analyzer mount 4 with the installed analyzer 3 and a lid 23 of thin sheet metal, with a window 24 that admits light. The upper slot 20 will be advantageously represented by a milled down area on the surface of the analyzer amount 4, and the lower slot 21 is designed as an embedded slot inside the analyzer mount 4. Because the upper rim of the upper slot 20 is covered by the lid 23, the analyzer mount 4 can have a particularly thin design.

The upper adjusting lever 8 engages with the upper slot 20 and can be seen in the section view. The lower adjusting lever engages with the lower slot 21 and does not appear in this section view. The slots 20, 21 are very flat in shape, since the adjusting levers 8, 9 are made of thin sheet metal.

Given the space-saving application of the very flat slots 20, 21 in the analyzer mount 4, the thickness of the analyzer insert 1 is determined almost solely by the thickness of the analyzer mount 4 itself. Here this is determined by the fact that to avoid disruptive reflexes in the optical path of the microscope the analyzer 3 is installed in the analyzer mount 4 at a slight incline (here, for example, an incline of 3.5°) relative to the rotating axis 16. When the analyzer insert 1 is inserted, the rotating axis 16 of the analyzer 3 coincides with the optical axis 7 of the microscope.

FIG. 3 shows a longitudinal section through the analyzer insert 1. Depicted are an adjusting wheel 2 with rotating axis 15 and an analyzer 3 in an analyzer mount 4 with rotating axis 16. They are mounted on a support 5. In the locked position of the analyzer insert 1 shown here, the center of the empty hole 6 rests on the optical axis 7 of the microscope. By shifting the entire analyzer insert 1 into the other locked position, the analyzer can be brought into the optical path of the microscope, in place of the empty hole 6, and thus the rotating axis 16 of the analyzer mount 4 can be made to overlap with the optical axis 7 of the microscope. The adjusting wheel 2 is connected to a superimposed flange 25 by means of a pulling pin 26, so that the flange 25 follows every movement of the adjusting wheel 2. The securing screw 19 for holding in place an analyzer position grips the flange 25.

The ends of the adjusting wheel 8 and 9 produced from thin sheet metal are mounted with bearing axles 14 on the flange 25 and the other ends with bearing axles 14 on the analyzer mount 4. The bearing axles 14 here are inexpensive ones. Since the depiction is only slightly enlarged, it is not possible to show the slots 20, 21 in the analyzer mount 4.

The position of the adjusting levers 8, 9 corresponds to the initial position, that is, the 0° position of the analyzer 3. To prevent this position from be passed over, the analyzer insert 1 is equipped with an overrun protection feature. It consists of a protruding pin 27 that is applied to the adjusting wheel 2, corresponding to the 0° position of the analyzer 3. In the swivel range of this pin 27, a stop screw 28 is mounted on the support 5. When the 0° position is reached, the pin 27 strikes against this stop screw 28 and thereby prevents the desired position from being overrun. A pin is also provided to guarantee the 180° position, but it is not shown here.

The resulting analyzer insert is extremely flat. It operates in precise fashion, but can still be produced cheaply. The invention is not limited to the described embodiments, but includes other conceivable embodiments as claimed.

List of Reference Symbols

1 analyzer insert
2 adjusting wheel
3 analyzer
4 analyzer mount
5 support
6 empty hole
7 optical axis of the microscope
8 upper adjusting lever
9 lower adjusting lever
10 end of upper adjusting lever 8 on adjusting wheel 2
11 end of lower adjusting lever 9 on adjusting wheel 2
12 end of upper adjusting lever 8 on analyzer mount 4
13 end of lower adjusting lever 9 on analyzer mount 4
14 bearing axles
15 rotating axis of adjusting wheel 2
16 rotating axis of analyzer mount 4
17 force lever
18 transmission direction of analyzer
19 securing screw
20 upper slot or milled down area for upper adjusting lever 8
21 lower slot for lower adjusting lever 9
22 gradation
23 lid
24 window in lid 23
25 flange
26 pulling pin
27 pin
28 stop screw
29 grooves

What is claimed is:

1. An analyzer insert for a polarization microscope comprising:

a support that can be inserted into an optical path of said microscope;

an externally positioned adjusting wheel mounted on said support, said adjusting wheel being rotatable by hand about a first rotational axis;

an internally positioned analyzer that can be inserted into an optical axis of said optical path;

an analyzer mount mounted on said support for rotation about a second rotational axis, said analyzer mount carrying said analyzer; and two equally long parallel adjusting levers each having an outer end pivotally connected to said adjusting wheel by respective bearing axles angularly spaced about said first rotational axis by 90 degrees relative to one another and radially spaced from said first rotational axis by a common distance, and an inner end pivotally connected to said analyzer mount by respective bearing axles angularly spaced about said second rotational axis by 90 degrees relative to one another and radially spaced from said second rotational axis by said common distance;

said two adjusting levers producing two equally long, perpendicular moment arms about said first rotational axis and about said second rotational axis.

2. The analyzer insert according to claim 1, wherein said analyzer has an initial rotational position and a terminal rotational position differing by 180 degrees.

3. The analyzer insert according to claim 1, wherein said analyzer has a central line connecting said first and second rotational axes, and said analyzer has an initial rotational position in which all of said bearing axles lie on one and the same side of said central line and in one and the same plane.

4. The analyzer insert according to claim 1, wherein said analyzer has a central rotational position in which said two adjusting levers lie at a maximum distance apart.

5. The analyzer insert according to claim 3, wherein said analyzer has a terminal rotational position in which all of said bearing axles lie on an opposite side of said central line from said one side and in a single plane parallel to said plane in which said bearing axles lie when said analyzer is in said initial rotational position.

6. The analyzer insert according to claim 1, wherein said two adjusting levers lie in two planes, one above the other, and the corresponding bearing pins of said two adjusting levers are of differing length.

7. The analyzer insert according to claim 1, wherein said two adjusting levers lie in the same lever plane, and at least one of said two levers includes outer and inner ends that are angled relative to said lever plane.

8. The analyzer insert according to claim 1, wherein said analyzer mount includes two slots, one above the other, that form circular segments about said second rotational axis, in which said bearing axles associated with said inner ends are positioned.

9. The analyzer insert according to claim 8, wherein said two slots are congruent.

10. The analyzer insert according to claim 8, wherein one of said two slots is formed on the inside of said analyzer mount and the other of said two slots is formed as a recessed area on an upper side of said analyzer mount.

11. The analyzer insert according to claim 2, further comprising two protruding pins angularly spaced on said adjusting wheel and a stop screw mounted on said support, whereby said stop screw operatively engages one of said two protruding pins when said analyzer is in said initial rotational position and said stop screw operatively engages the other of said two protruding pins when said analyzer is in said terminal rotational position, whereby overrun beyond said initial and terminal positions is prevented.

12. An analyzer insert according to claim 2, wherein each of said two adjusting levers includes a recessed portion at said inner end thereof, whereby the adjusting levers remain outside of an optically effective area of said analyzer in all rotational positions of said analyzer from said initial rotational position through said terminal rotational position.

13. The analyzer insert according to claim 1, wherein said bearing axles are pins.

14. The analyzer insert according to claim 1, wherein each of said two adjusting levers comprises a thin metal strip.

15. The analyzer insert according to claim 1, wherein said analyzer is mounted within said analyzer mount at a slight incline relative to said optical axis.

16. The analyzer insert according to claim 1, wherein said support includes a portion thereof intended for insertion into said microscope that has a maximum thickness of five millimeters.

* * * * *